United States Patent [19]

Gutsmann et al.

[11] Patent Number: 5,438,371
[45] Date of Patent: Aug. 1, 1995

[54] DATA TRANSMISSION METHOD

[75] Inventors: Rolf-Dieter Gutsmann; Siegfried Böhme; Hartmut Hackmann; Leo Warmuth, all of Hamburg, Germany

[73] Assignee: U.S. Philips Corporation, New York, N.Y.

[21] Appl. No.: 82,071

[22] Filed: Jun. 23, 1993

[30] Foreign Application Priority Data

Jul. 2, 1992 [DE] Germany .................. 42 21 683.4

[51] Int. Cl.⁶ .................................. H04N 11/12
[52] U.S. Cl. ........................ 348/492; 348/470
[58] Field of Search .............. 358/15, 12, 11, 21 R, 358/64, 242, 138; H04N 11/12; 348/473, 488, 492, 496, 495, 470

[56] References Cited

U.S. PATENT DOCUMENTS

| | | | |
|---|---|---|---|
| 4,068,258 | 1/1978 | Bied-Charreton et al. | 358/12 X |
| 4,188,638 | 2/1980 | de Haan | 358/15 X |
| 4,958,230 | 9/1990 | Jonnalagadda et al. | 358/15 X |
| 5,053,860 | 10/1991 | Tsinberg | 358/15 X |

Primary Examiner—Victor R. Kostak
Attorney, Agent, or Firm—David Schreiber

[57] ABSTRACT

At least a first and a second digital signal, both in parallel form, are converted to a single serial signal and transmitted from a digital color decoder to a signal processing unit so as to avoid picture disturbances in the signal processing unit. The first digital signal is dependent on the instantaneous value of a clock frequency used in the decoder for processing a digital color picture signal, and the second digital signal is dependent on the instantaneous value of a chrominance subcarrier frequency generated in the decoder and used for color decoding.

11 Claims, 2 Drawing Sheets

DATA TRANSMISSION METHOD

BACKGROUND OF THE INVENTION

1. Field of the Invention

The invention relates to a method of transmitting data from a digital color decoder, which decodes a digital color picture signal, to another signal processing unit. The invention also relates to an arrangement for performing said method.

In television technology color decoders are used to decode color information present in a coded form in a picture signal and to furnish this information for further signal processing, particularly for picture display. Such a color decoder particularly supplies the picture signal data as output signals. However, further control data may also be transmitted to other signal processing units.

2. Summary of the Invention

It is an object of the invention to further develop such a transmission method in such a way that subsequent signal processing units can further process the decoded digital color picture signal in a simpler manner.

According to the invention, this object is achieved in that at least a first and a second digital signal are serially transmitted in one signal from the decoder to the signal processing unit, in that the first digital signal is dependent on the instantaneous value of a clock frequency used in the decoder, with which frequency the digital signal is processed in the decoder, and in that the second digital signal is dependent on the instantaneous value of a chrominance subcarrier frequency generated in the decoder, which frequency is used for color decoding.

For further processing the digital picture signal decoded by the digital color decoder, i.e. for further processing its time-discrete sampling values, it is particularly advantageous to have the sampling clock available, or the clock with which this signal has been further processed. This particularly applies when this clock fluctuates with respect to time, for example when the picture signal originates from a video recorder which supplies the picture signal at a fluctuating horizontal frequency.

The two digital signals which, combined to one signal, are consecutively transmitted serially in one signal from the decoder to a subsequent signal processing unit, supply the two essential dam about the color picture signal, viz. particularly its clock frequency or the clock frequency with which the signal is processed in the decoder, and the instantaneous value of the chrominance subcarrier frequency generated in the decoder, with which the color decoding is effected in the decoder. By transmitting these two data to subsequent signal processing units, fluctuating values of these two frequencies are known to the subsequent signal processing unit and can be taken into account accordingly.

The subsequent signal processing unit may be, for example, a television apparatus used for displaying the picture signal. However, in recent years digital color decoders have also been used for supplying the decoded digital color picture signal to a computer in which it can be further processed or at least partly processed. The picture signal thus processed is then applied again to a digital coder which retransforms it to a color picture signal of the desired transmission standard. This processing operation by a computer is, however, only effected temporarily so that during other periods of time the digital color picture signal supplied by the color decoder is directly applied to the coder in which it is coded again. Particularly during these periods of time it is very advantageous for the coder that the information about the clock frequency used in the decoder, as well as the chrominance subcarrier frequency used is available, because these two values need not be produced again in the coder and particularly because in this way also fluctuating values of these two frequencies are known to the coder which could hardly gain these frequencies. Thus, in this way a much more precise and particularly low-noise coding of the decoded digital color picture signal can be realized in the coder.

In accordance with an embodiment of the invention, the clock frequency used in the decoder is dependent on the horizontal frequency of the digital color picture signal. Particularly in this case fluctuations of the horizontal frequency may occur in the picture signal when supplied by a video recorder or similar apparatus. These horizontal frequency fluctuations result in corresponding fluctuations of the clock frequency. If these clock frequency fluctuations are, for example, not known to a subsequent coder or a deflection processor, these devices would further process the signal with an incorrect time base, which would directly result in a disturbance of the picture. Due to the transmission according to the invention of the relevant data, the coder can fully take over the fluctuating clocks and process the picture signal without any disturbance.

In accordance with a further embodiment of the invention, the PAL or SECAM switching phase is transmitted as a third digital signal. In color picture signals of the PAL or SECAM standard, it is also very advantageous to know the linealternating switching phase. The signal processing unit arranged behind the decoder can then advantageously be informed of this switching phase as a third digital signal, which can be taken into account accordingly during the color coding process.

In accordance with a further embodiment of the invention, a value is transmitted per picture line of the digital color picture signal for each one of the digital signals to be transmitted. Since the values of the two or three digital signals vary only once per picture line, one single transmission within this period of time will be sufficient.

In accordance with a further embodiment of the invention, the signal processing unit receiving the transmitted digital signals is a digital color coder which at least temporarily recodes the decoded picture signal supplied by the decoder.

As already explained hereinbefore, the method according to the invention may be particularly used to advantage for a coder in the form of a signal processing unit, because the digital signals transmitted in accordance with the invention contribute to a very clear enhancement of the picture quality of the color picture signal recoded by the coder. This is all the more true as the digital signals required for the coder are present in the decoder anyway and are to be transmitted to the coder only.

In accordance with a funher embodiment of the invention, the signal processing unit is a deflection processor of a picture display device.

Known 100 Hz color television display devices often include a digitally operating color decoder which operates at a clock frequency which is dependent on the horizontal frequency of the picture signal. In the case of fluctuations of the horizontal frequency of the picture signal, the deflection processor may cause disturbances in the display of the picture signal. This is particularly true when the picture signal is supplied by a video recorder and when very strong fluctuations of the horizontal frequency occur at the start and the end of each field due to the change of the video heads in the recorder. As a result of these fluctuations of the horizontal frequency, the deflection processor attempting to adapt to these fluctuations may itself cause additional disturbances so that additional picture disturbances occur at the upper or lower picture edge. The transmission according to the invention of at least the first and the second digital signal enable the deflection processor to directly detect the clock frequencies used and to recognize, and accordingly take into account, fluctuations of these clock frequencies. A kind of synchronization up to the clock frequencies used, or a decoupling is then no longer necessary.

In accordance with a further embodiment of the invention, the first digital signal is an increment signal which is applied to a digital controllable oscillator in a horizontal frequency phase-locked loop provided in the color decoder.

In digital color decoders which operate at a clock frequency which is dependent on the horizontal frequency of the picture signal, a horizontal frequency phase-locked loop is generally provided which is used for generating the clock signal. This phase-locked loop incorporates a controllable oscillator which receives a fixed clock frequency and an increment signal which is directly dependent on the instantaneous value of the horizontal frequency of the picture signal. This increment signal may be advantageously transmitted as the first digital signal to a signal processing unit, because this increment signal is directly dependent on the value of the clock frequency which is generated by the horizontal frequency phase-locked loop for further signal processing in the decoder, and because this increment signal is present in the decoder anyway and thus need not be additionally generated for transmission to the signal processing unit. With reference to the increment signal, the subsequent signal processing unit may directly react to fluctuations of the clock frequency with which the picture signal has been decoded or processed.

In accordance with a further embodiment of the invention, the second transmitted digital signal is a chrominance subcarrier increment signal which is applied to a digital controllable oscillator in a chrominance subcarrier phase-locked loop provided in the color decoder.

Similar considerations as for the first digital signal explained above apply to the second digital signal. Digital color decoders generally have a chrominance subcarrier phase-locked loop whose chrominance subcarrier increment signal can be used as a second digital signal and is a direct measure for the instantaneous value of the chrominance subcarrier frequency with which the color picture signal is decoded in the digital color decoder.

In accordance with a further embodiment of the invention, relating to an arrangement for performing the method, the digital signals to be transmitted and being present in a parallel form in the decoder are applied to a converter arrangement which converts the digital signals into a serial form, while a further converter arrangement is provided which converts the serially received data into parallel data which are applied to the signal processing unit.

As already stated, the values of the first and the second digital signal are present in the decoder anyway and may have to be converted only for the purpose of processing. For example, the above-mentioned increment signals used in the phase-locked loops are present as parallel values. If these increment signals are to be transmitted as a first and a second digital signal, the converter arrangements are provided to convert the signals for transmission in a serial form and to possibly reconvert them into a parallel form again in the signal processing unit. These converter arrangements may be realized in a relatively simple manner by means of shift registers and may be either integrated in the decoder and the signal processing unit or realized outside this unit.

These and other aspects of the invention will be apparent from and elucidated with reference to the embodiments described hereinafter.

DESCRIPTION OF THE PREFERRED EMBODIMENT

Figure 1:
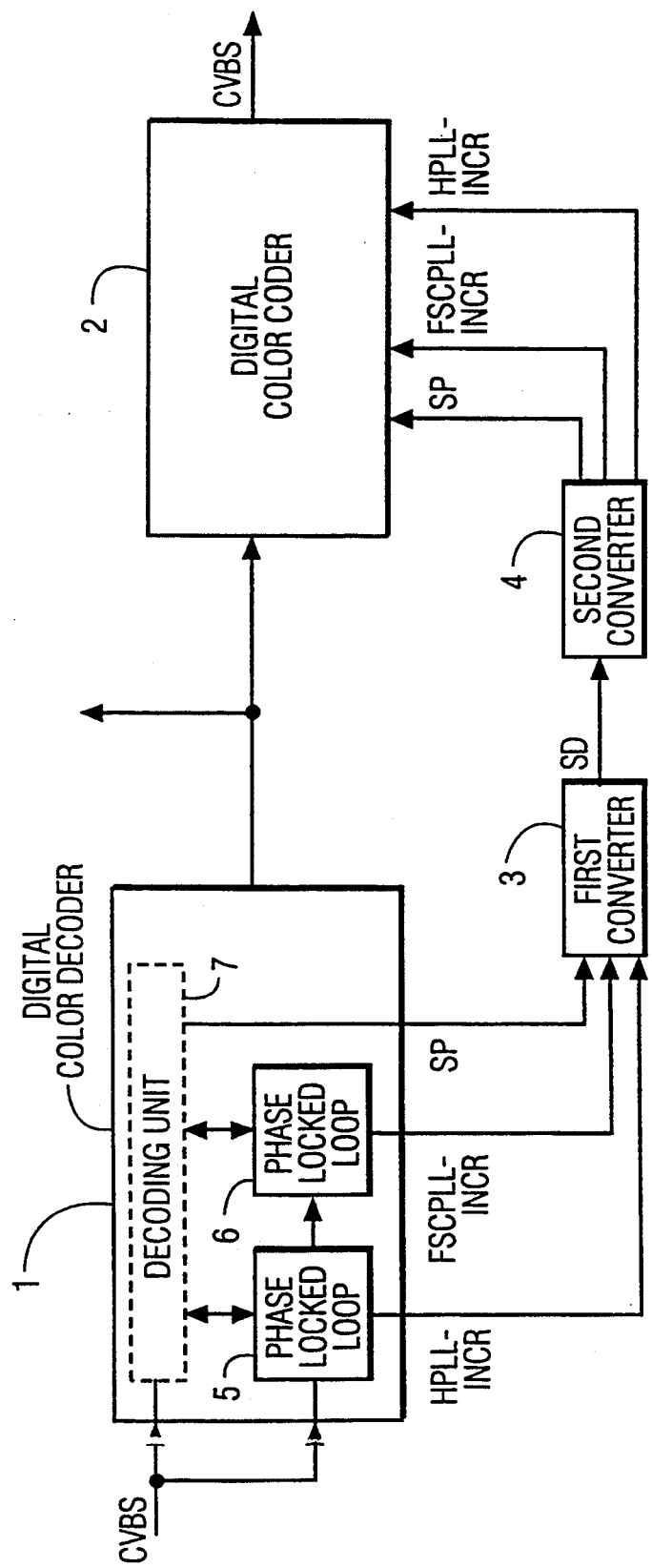
FIG. 1 is a block diagram of an arrangement including a digital color decoder, two converter arrangements and a digital color coder.

The block diagram of FIG. 1 shows an arrangement in which, according to the invention, at least two digital signals in addition to a digital color picture signal, are serially transmitted as one signal from a digital color decoder 1, diagrammatically shown in the Figure to another signal processing unit, particularly a digital color coder 2 shown in FIG. 1.

To this end a first converter arrangement 3 is provided which converts signals supplied by the digital color decoder 1 from their parallel form into a signal in serial form. A second converter arrangement 4 is further provided which splits up the signal applied thereto in serial form into at least the first and the second digital signal again and converts these signals into the parallel form for supply to the digital coder 2.

The digital color decoder 1 receives a digital color picture signal which is denoted by CVBS in the Figure. In this color decoder, this picture signal supplies synchronizing signals which comprise the vertical frequency, i.e. the field frequency, and the horizontal frequency, i.e. the frequency at which the picture lines alternate. In the digital color decoder 1 two clock signals are obtained, namely, the clock signal with which the picture signal is further processed in the color decoder and possibly also further subsequently arranged signal processing units. In particular, this clock signal may be dependent on the horizontal frequency of the picture signal. To obtain this clock signal, the color decoder 1 incorporates a phase-locked loop 5 which is shown only diagrammatically in FIG. 1. A controllable oscillator (not shown) incorporated in this phase-locked loop 5 receives an increment signal which in its turn is again directly dependent on fluctuations of the horizontal frequency of the picture signal. Due to the dependence of the horizontal frequency and the generated clock frequency, this signal also represents the corresponding fluctuations of the clock frequency with which the digital signal is processed in the decoder.

This increment signal, which is denoted by HPLL-INCR in the Figure, is thus directly suitable as the first digital signal for transmission to another signal processing unit.

The digital color decoder 1 also incorporates a funher phase-locked loop 6 which is used for generating the chrominance subcarrier frequency with which the color decoding in the decoder 1 is effected in a decoding unit 7 which is diagrammatically shown in FIG. 1. In principle, the phase-locked loop 6 has a structure which is similar to that of the phase-locked loop 5; particularly, a controllable oscillator (not shown) provided in this loop also receives an increment signal which is directly dependent on the instantaneous value of the chrominance subcarrier frequency generated by the phase-locked loop. This signal, denoted by FSCPLL-FNCR in FIG. 1, is suitable for transmission as the second digital signal according to the invention.

The switching phase of a PAL or SECAM signal, which switching phase is denoted by SP in the Figure, is also to be determined in the decoding unit 7 of the color decoder 1.

These three digital signals are already present in the decoder 1 and are applied in a parallel form to the converter arrangement 3 which converts these signals into a serial sequence in a single signal. The three signals are thus transmitted consecutively with respect to time in a serial form as the signal denoted by SD in the Figure to the converter arrangement 4. The signal is split up into three separate signals again in this converter arrangement 4 and these three signals are converted into their parallel form and applied to the digital color coder 2. With reference to the values of the digital signals, the digital color coder 2 directly recognizes the fluctuations of the clock frequency or of the chrominance subcarrier frequency and can take these fluctuations into account in the coding process.

This is particularly advantageous when the color signal decoded by the decoder 1 is immediately and subsequently coded again by the coder 2. During other periods of time, the decoded signal may be applied, for example to a computer in which it can be changed or processed.

Instead of the coder 2 arranged as a signal processing unit, i.e. as a receiver of the digital signals transmitted in the signal SD, other functional units may be provided in which the decoded color picture signal is further processed. For example, a deflection unit of a television display device may be provided as a signal processing unit which may utilize clock-frequency fluctuations to avoid disturbances in the picture display in the case of strongly fluctuating clock frequencies.

Figure 2:
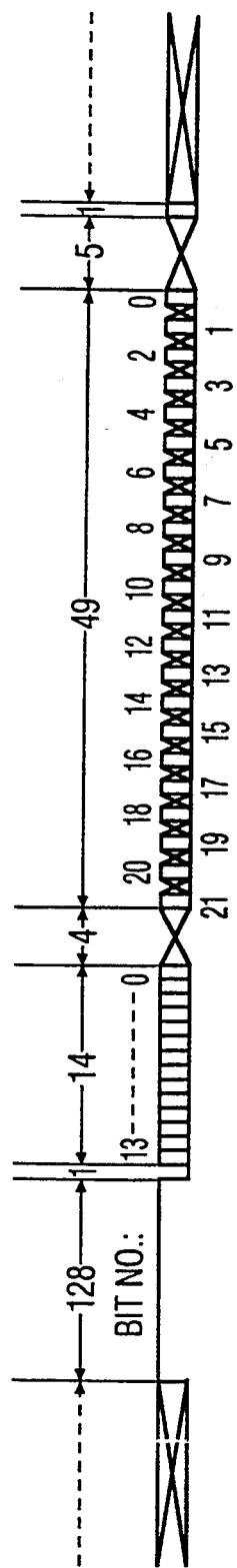
FIG. 2 is a time diagram of digital signals transmitted between the two converter arrangements shown in FIG. 1.

FIG. 2 show by way of example, the serial signal transmitted between the two converter arrangements 3 and 4 in FIG. 1.

Since the values of the clock frequency with which the digital signal is processed in the decoder, as well as the chrominance subcarrier frequency with which the color decoding is effected in the decoder can change only once per picture line of the digital picture signal, it is sufficient to transmit the corresponding values of these two digital signals only once per picture line of the picture signal.

The transmission between the two converter arrangements 3 and 4 shown in FIG. 1 is effected at such a clock rate that the corresponding values can be transmitted with a sufficient number of bits.

In FIG. 2 a high level is set for the first 128 clock periods of the transmitted signal SD and subsequently a low level is set for one clock period. This sequence is used for recognizing a subsequent transmission, i.e. the up-synchronization of the converter arrangement 4 in accordance with FIG. 1.

Subsequently, in accordance with FIG. 2, for example, the digital signal HPLL-INCR is transmitted whose 14 bits are serially and consecutively transmitted. Thereafter, four bits are free. The following 49 time slots are utilized for transmitting the digital signal FSCPLL-INCR which, in the representation according to FIG. 2, is only transmitted at half the clock frequency, which implies for the transmission itself that every second time slot is not utilized. The signal FSCPLL-INCR has 22 bits which are serially and consecutively transmitted. The signal FSCPLL-INCR is only transmitted at half the clock frequency because, both in the digital color decoder and in another signal processing unit which receives the signal, this second digital signal indicating the instantaneous value of the chrominance subcarrier frequency is also generally processed at only half the clock frequency as compared with the processing of the first digital signal which indicates the clock frequency used. After transmission of the signal FSCPLL-INCR, five bits are not utilized in accordance with the representation of FIG. 2. Subsequently, the switching phase of a PAL or SECAM signal is transmitted with one bit.

After this transmission, a phase, whose length is different dependent on its use, sets in, in which phase no signals are transmitted in the serial signal. For the next picture line of the picture signal, new values are then transmitted again. This is identified again in accordance with the example shown in FIG. 2 by means of 128 high clocks and one low clock of the transmitted signal.

The word widths for the signals HPLL-INCR and FSCPLL-INCR chosen in the representation according to FIG. 2 are of course dependent on their concrete use and may be chosen in dependence upon the desired accuracy.

We claim:

1. A method of transmitting data from a digital color decoder, said digital color decoder decoding a digital color picture signal, to another signal processing unit, characterized in that said method comprises the steps:

generating a first digital signal in said digital color decoder, said first digital signal being dependent on the instantaneous value of a clock frequency used in the digital color decoder;

generating a second digital signal in said digital color decoder, said second digital signal being dependent on the instantaneous value of a chrominance subcarrier frequency used for color decoding and generated in the digital color decoder; and serially transmitting said first and second digital signals as one signal from the digital color decoder to said signal processing unit, wherein said one signal is processed at the clock frequency used in said digital color decoder.

2. A method as claimed in claim 1, characterized in that the clock frequency used in the decoder is dependent on the horizontal frequency of the digital color picture signal.

3. A method as claimed in claim 1, characterized in that the digital color picture signal is in accordance with the PAL or SECAM standard, and a switching phase of the digital color picture signal and generated in said digital color decoder is transmitted as a third digital signal.

4. A method as claimed in claim 1, characterized in that a value is transmitted per picture line of the digital color picture signal for each one of the digital signals to be transmitted.

5. A method as claimed in claim 1, characterized in that the signal processing unit receiving the transmitted digital signals is a digital color coder which, at least temporarily, recodes the decoded picture signal supplied by the decoder.

6. A method as claimed in claim 1, characterized in that the signal processing unit is a deflection processor of a picture display device.

7. A method as claimed in claim 1, characterized in that the first digital signal is an increment signal which is applied to a horizontal frequency phase-locked loop provided in the color decoder.

8. A method as claimed in claim 1, characterized in that the second digital signal is a chrominance subcarrier increment signal which is applied to in a chrominance subcarrier phase-locked loop provided in the color decoder.

9. A method as claimed in claim 1, characterized in that each value of the first digital signal is transmitted with a word width of at least 14 bits.

10. A method as claimed in claim 1, characterized in that each value of the second digital signal is transmitted with a word width of at least 20 bits, and in that the values of the second digital signal, as compared with the values of the first digital signal, are transmitted in said one signal at half the clock frequency.

11. An arrangement for transmitting data from a digital color decoder decoding a digital color picture signal, to another signal processing unit, said digital color decoder including means for generating a first digital signal in said digital color decoder, said first digital signal being dependent on the instantaneous value of a clock frequency used in the digital color decoder, and means for generating a second digital signal in said digital color decoder, said second digital signal being dependent on the instantaneous value of a chrominance subcarrier frequency used for color decoding and generated in the digital color decoder, said first and second digital signals being present in parallel form, characterized in that said arrangement comprises;

a first converter circuit to which said first and said second digital signal are applied, said first converter circuit converting the first and second digital signals into one signal in serial form and transmitting said one signal; and a second converter circuit, coupled to receive said transmitted one signal, for converting said one signal back into said first and second digital signals for application to the signal processing unit.

* * * * *